US012664642B2

(12) United States Patent
Tu et al.

(10) Patent No.: US 12,664,642 B2
(45) Date of Patent: Jun. 23, 2026

(54) APPEARANCE DETECTION METHOD AND APPARATUS FOR BARE CELL, COMPUTER DEVICE, AND STORAGE MEDIUM

(71) Applicant: CONTEMPORARY AMPEREX TECHNOLOGY (HONG KONG) LIMITED, Hong Kong (CN)

(72) Inventors: Yinhang Tu, Ningde (CN); Xiaofeng Liu, Ningde (CN); Jinping Zhu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 297 days.

(21) Appl. No.: 18/503,170

(22) Filed: Nov. 6, 2023

(65) Prior Publication Data

US 2024/0070852 A1     Feb. 29, 2024

Related U.S. Application Data

(63) Continuation of application No. PCT/CN2023/084032, filed on Mar. 27, 2023.

(30) Foreign Application Priority Data

Aug. 10, 2022     (CN) .......................... 202210957577.6

(51) Int. Cl.
*G06T 7/00*          (2017.01)
*G06T 7/13*          (2017.01)
(52) U.S. Cl.
CPC ............... *G06T 7/001* (2013.01); *G06T 7/13* (2017.01); *G06T 2207/30108* (2013.01)

(58) Field of Classification Search
None
See application file for complete search history.

(56) References Cited

U.S. PATENT DOCUMENTS

2014/0362248 A1* 12/2014 Ishida ...................... G06T 7/13
                                                         348/222.1
2021/0209739 A1     7/2021 Wen et al.

FOREIGN PATENT DOCUMENTS

CN          107941805 A      4/2018
CN          109269419 A      1/2019
(Continued)

OTHER PUBLICATIONS

The extended European search report received in the counterpart EP application 23797624.6, dated May 7, 2025, 7 pages.
(Continued)

*Primary Examiner* — Amandeep Saini
*Assistant Examiner* — Caroline Tabancay Duffy
(74) *Attorney, Agent, or Firm* — K&L Gates LLP

(57) ABSTRACT

Provided are an appearance detection method and apparatus for a bare cell, a computer device, a computer-readable storage medium, a computer program product, and an appearance detection system for a bare cell, where the method includes: obtaining a cell picture of the bare cell by shooting, the cell picture being obtained by shooting in alignment with positions of tabs on an edge of the bare cell; determining a detection object in the cell picture; and performing appearance detection based on the detection object to obtain detection result information. The cell picture is obtained by shooting in alignment with the positions of the tabs on the edge of the bare cell, such that imaging of cell edges is parallel light reflection imaging.

20 Claims, 5 Drawing Sheets

(56)     References Cited

FOREIGN PATENT DOCUMENTS

| CN | 109358064  | A |   | 2/2019  |                       |
|----|------------|---|---|---------|-----------------------|
| CN | 109443418  | A | * | 3/2019  | ............. G01D 21/02 |
| CN | 111192246  | A |   | 5/2020  |                       |
| CN | 111403800  | A | * | 7/2020  | ......... H01M 10/058  |
| CN | 111584923  | A | * | 8/2020  | ............. G01B 11/00 |
| CN | 112557390  | A |   | 3/2021  |                       |
| CN | 112577421  | A |   | 3/2021  |                       |
| CN | 113097570  | A | * | 7/2021  | ............. H01M 4/13 |
| CN | 113409296  | A | * | 9/2021  | ............. G06T 7/11 |
| CN | 214957024  | U |   | 11/2021 |                       |
| CN | 113989232  | A |   | 1/2022  |                       |
| CN | 114740001  | A | * | 7/2022  | ............. G01B 11/02 |
| CN | 114813745  | A |   | 7/2022  |                       |
| CN | 115829913  | A |   | 3/2023  |                       |
| DE | 202022101348 | U1 |  | 4/2022  |                       |
| JP | H08101133  | A | * | 4/1996  |                       |
| WO | WO-2021169335 | A1 | * | 9/2021 | ............. G06V 10/25 |

OTHER PUBLICATIONS

International Search Report received in the corresponding International Application PCT/CN2023/084032, mailed Jun. 8, 2023.
Written Opinion received in the corresponding International Application PCT/CN2023/084032, mailed Jun. 8, 2023.

Linghu Rong, "Defect Detection of Rubber Damping Pad Based on VisionPro", published on Shangxi Electronic Technology vol. 1 on Dec. 31, 2016, p. 3-4.
Lushen Wu et al., "Design of Solar Cell Panel Calibration System Based on Machine Vision", published on Modular Machine Tool Automatic Manufacturing Technique vol. 5 on May 31, 2018, p. 23-29.
Fanrong Kong et al., "Industrial Intelligent Transformation Methods and Practices", published by Shanghai Science and Technology Press on Jul. 31, 2020, p. 193-197.
Yong Huang, "Power Battery and Energy Management Technology", published by Chongqing University Press on Sep. 30, 2021, p. 42-46.
Xuehong Sun, "Machine Vision Technology and Applications", published by Mechanical Engineering Industry Press on Apr. 30, 2021, p. 64-71.
First Office Action received in the corresponding Chinese Application 20221095577.6, mailed Jun. 6, 2023.
Second Office Action received in the corresponding Chinese Application 20221095577.6, mailed Aug. 22, 2023.
Notification to Grant Patent Right for Invention received in the corresponding Chinese Application 202210957577.6, mailed Mar. 11, 2024.
Office Action, mailed Nov. 27, 2025, for corresponding European Patent Application Serial No. 23797624.6.

* cited by examiner

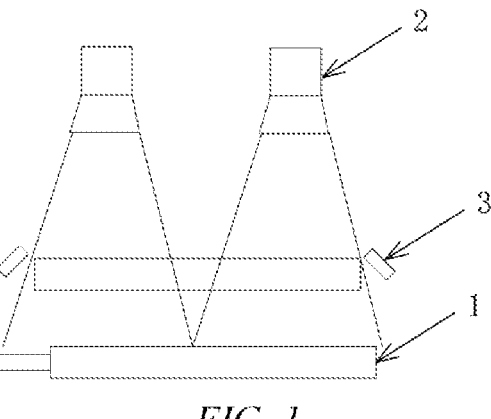
*FIG. 1*
Obtain a cell picture of a bare cell by shooting          S110
Determine a detection object in the cell picture          S120
Perform appearance detection based on the detection
object to obtain detection result information          S130
*FIG. 2*
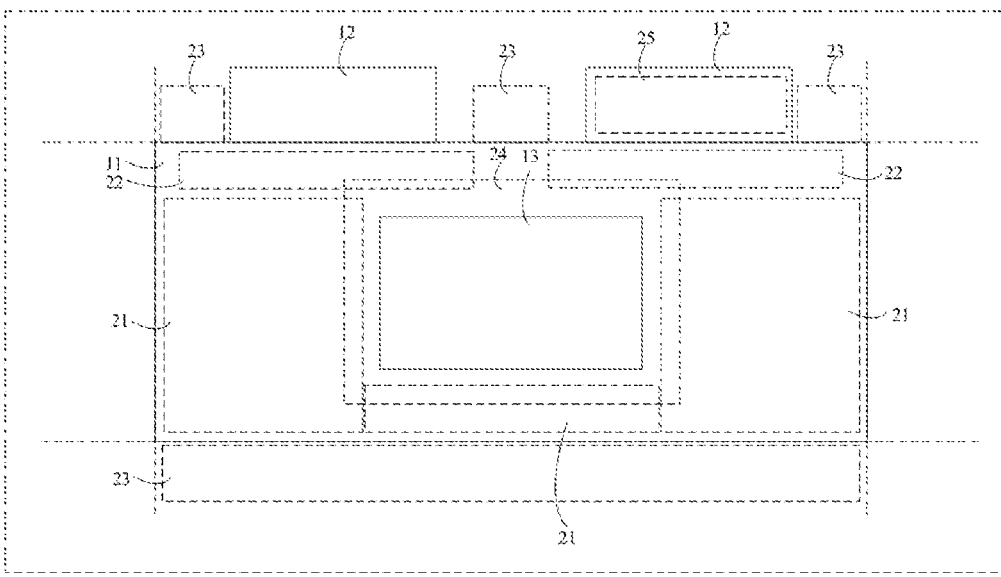
*FIG. 3*

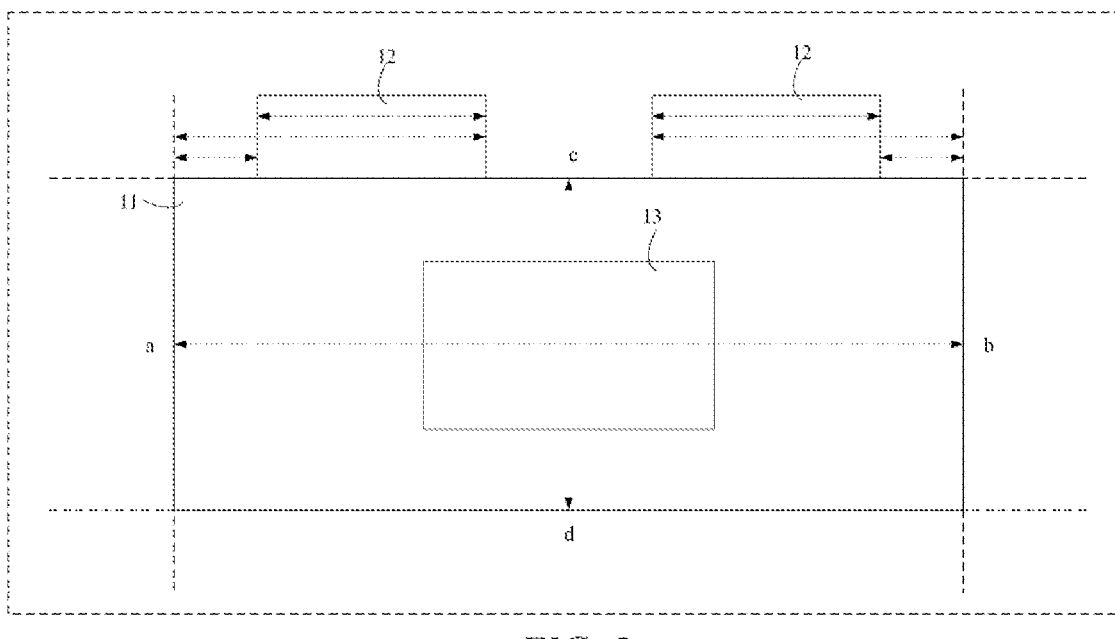

*FIG. 5*

| Calculate distances between all points on an edge of a cell separator and an opposite edge to obtain edge distance data | S132 |
| --- | --- |
| Obtain size data by performing averaging on the edge distance data | S134 |

*FIG. 6*

| Determine a pin pulling detection region based on an edge of a cell separator | S136 |
| --- | --- |
| Perform detection on the pin pulling detection region to obtain a pin pulling detection result | S138 |

*FIG. 7*

APPEARANCE DETECTION METHOD AND APPARATUS FOR BARE CELL, COMPUTER DEVICE, AND STORAGE MEDIUM

CROSS-REFERENCE TO RELATED APPLICATIONS

This application is a continuation of international application PCT/CN2023/084032, filed Mar. 27, 2023, which claims priority to Chinese patent application no. 202210957577.6, filed on Aug. 10, 2022, and entitled "APPEARANCE DETECTION METHOD AND APPARATUS FOR BARE CELL, COMPUTER DEVICE, AND STORAGE MEDIUM", which is incorporated herein by reference in its entirety.

TECHNICAL FIELD

The present application relates to the field of battery detection technologies, and particularly provides an appearance detection method and apparatus for a bare cell, a computer device, a computer-readable storage medium, a computer program product, and an appearance detection system for a bare cell.

BACKGROUND ART

With the continuous popularization of new energy vehicles, lithium-ion batteries have been widely used in electric vehicles and become one of the main power sources of electric vehicles.

At present, lithium batteries used in electric vehicles mainly include lithium iron phosphate batteries. Lithium iron phosphate batteries have characteristics of a high capacity, a high output voltage, good charging and discharging cycling performance, etc. The appearance detection of bare cells is an extremely important process in the production process of cells of batteries. How to improve the accuracy of appearance detection of bare cells is an urgent problem to be solved.

SUMMARY OF THE INVENTION

In view of the above problems, the present application provides an appearance detection method and apparatus for a bare cell, a computer device, a computer-readable storage medium, a computer program product, and an appearance detection system for a bare cell.

In a first aspect, the present application provides an appearance detection method for a bare cell, where the method is applied to a control device, the control device may be specifically implemented by a logic controller, and the method includes:

obtaining a cell picture of the bare cell by shooting, the cell picture being obtained by shooting in alignment with positions of tabs on an edge of the bare cell;

determining a detection object in the cell picture; and performing appearance detection based on the detection object to obtain detection result information.

According to the above appearance detection method for a bare cell, the cell picture is obtained by shooting in alignment with the positions of the tabs on the edge of the bare cell, such that imaging of cell edges is parallel light reflection imaging, which reduces an impact of a thickness of the cell on the edge authenticity of the tabs of the cell during imaging, and ensures the accuracy of image acquisition, thereby improving the accuracy of appearance detection of the bare cell.

In some embodiments, the cell picture includes a first cell picture, an exposure of the first cell picture is higher than a preset exposure threshold, and the detection object includes an edge of a cell separator; and the determining a detection object in the cell picture includes: determining a reference position in the first cell picture based on a preset cell model, and finding the edge of the cell separator based on the reference position.

In the above embodiment, the higher-exposure picture of the bare cell is obtained by shooting at a higher exposure, which increases an edge contrast color difference of the bare cell, and facilitates edge finding of the cell, and the reference position in the higher-exposure picture is determined based on the preset cell model, so as to accurately and quickly obtain the edge of the cell separator.

In some embodiments, the detection result information includes size data; and the performing appearance detection based on the detection object to obtain detection result information includes:

calculating distances between all points on an edge of the cell separator and an opposite edge to obtain a plurality of pieces of edge distance data; and obtaining the size data based on the plurality of pieces of edge distance data.

In the above embodiment, the distances between all points on an edge of the cell separator and an opposite edge are calculated, so as to quickly and accurately obtain the size data of the bare cell.

In some embodiments, the edge distance data includes length data and width data; and the obtaining the size data based on the plurality of pieces of edge distance data includes:

performing averaging on a plurality of pieces of length data to obtain an average length value;

performing averaging on a plurality of pieces of width data to obtain an average width value; and obtaining the size data based on the average length value and the average width value.

In the above embodiment, the distances between all points on an edge of the cell separator and an opposite edge are calculated, and averaging is performed on both the length data and the width data in the edge distance data, so as to obtain the size data of the bare cell, which can ensure the accuracy of size detection.

In some embodiments, the detection result information includes a pin pulling detection result; and the performing appearance detection based on the detection object to obtain detection result information includes: determining a pin pulling detection region based on the edge of the cell separator; performing detection on the pin pulling detection region to obtain the pin pulling detection result.

In the above embodiment, the pin pulling detection region is determined based on the edge of the cell separator, and pin pulling detection may be quickly and conveniently performed on the pin pulling detection region.

In some embodiments, the performing detection on the pin pulling detection region to obtain the pin pulling detection result includes: looking for and obtaining spot information within the pin pulling detection region, and obtaining the pin pulling detection result by analysis based on the spot information.

In the above embodiment, the spot information is found and obtained in the pin pulling detection region, and pin pulling detection on the bare cell can be quickly implemented based on the obtained spot information.

In some embodiments, the spot information includes at least one of an area of a single spot, a size of a spot, and a sum of spot areas.

In the above embodiment, it may be set, according to actual situations, that pin pulling detection is performed on the bare cell based on one or more of an area of a single spot, a size of a spot, and a sum of spot areas, so as to improve the detection convenience.

In some embodiments, the performing detection on the pin pulling detection region to obtain the pin pulling detection result includes:

obtaining distance values between edge points of the cell separator in the pin pulling detection region and the corresponding edge; and obtaining the pin pulling detection result by analysis based on the plurality of distance values.

In the above embodiment, pin pulling detection is performed by analysis on the distance values between edge points of the cell separator in the pin pulling detection region and the corresponding edge, which facilitates finding of protrusions of the entire edge caused during pin pulling.

In some embodiments, the obtaining the pin pulling detection result by analysis based on the plurality of distance values includes:

sorting the plurality of distance values to obtain the sorted distance values;

selecting a maximum value of the sorted distance values; and obtaining the pin pulling detection result by analysis based on the selected maximum value.

In the above embodiment, pin pulling detection is performed based on the maximum value of the distance values, so that finding of protrusions of the entire edge caused during pin pulling can be properly and quickly implemented.

In some embodiments, after the performing appearance detection based on the detection object to obtain detection result information, the method further includes: storing, by a host computer, the detection result information by binding the information with identification information of the bare cell.

In the above embodiment, the detection result information is stored by binding the information with the identification information of the bare cell, so as to facilitate sorting of the bare cell at a next station based on the detection result information.

In some embodiments, the cell picture is shot by using two cameras respectively in alignment with the positions of the tabs on the edge of the bare cell.

In the above embodiment, the cell picture is acquired by using the two cameras, so that global detection of detection elements can be implemented, the accuracy of the detection result can be improved, and the probabilities of false detection and missed detection can be reduced.

In a second aspect, the present application provides an appearance detection apparatus for a bare cell, including:

a picture obtaining module configured to obtain a cell picture of the bare cell by shooting, the cell picture being obtained by shooting in alignment with positions of tabs on an edge of the bare cell;

a picture processing module configured to determine a detection object in the cell picture; and a picture detection module configured to perform appearance detection based on the detection object to obtain detection result information.

In a third aspect, the present application provides a computer device, including: a memory and one or more processors, where the memory stores computer-readable instructions that, when executed by the one or more processors, cause the one or more processors to perform the steps of the above appearance detection method for a bare cell.

In a fourth aspect, the present application provides one or more computer storage media storing computer readable instructions that, when executed by one or more processors, cause the one or more processors to perform the steps of the above appearance detection method for a bare cell.

In a fifth aspect, the present application provides a computer program product, where the computer program, when executed by one or more processors, causes the one or more processors to perform the steps of the above appearance detection method for a bare cell.

In a sixth aspect, the present application provides an appearance detection system for a bare cell, including: an image obtaining apparatus and a host computer, where the image obtaining apparatus is configured to obtain a cell picture by shooting in alignment with positions of tabs on an edge of the bare cell, and send the cell picture to the host computer; and the host computer is configured to perform appearance detection on the bare cell by using the above appearance detection method for a bare cell.

In some embodiments, the image obtaining apparatus includes two cameras.

In the above embodiment, the cell picture is acquired by using the two cameras, so that global detection of detection elements can be implemented, the accuracy of the detection result can be improved, and the probabilities of false detection and missed detection can be reduced.

The above description is only an overview of the technical solutions of the present application. In order to more clearly understand the technical means of the present application to implement same according to the contents of the description, and in order to make the above and other objectives, features and advantages of the present application more obvious and understandable, specific implementations of the present application are exemplarily described below.

BRIEF DESCRIPTION OF THE DRAWINGS

Various other advantages and benefits will become apparent to those of ordinary skill in the art upon reading the following detailed description of preferred implementations. Accompanying drawings are merely for the purpose of illustrating the preferred implementations and are not to be construed as limiting the present application. Moreover, like components are denoted by like reference numerals throughout the accompanying drawings. In the drawings:

FIG. 1 is a schematic diagram of a scenario for an appearance detection method for a bare cell according to some embodiments;

FIG. 2 is a schematic flowchart of an appearance detection method for a bare cell according to some embodiments;

FIG. 3 is a schematic diagram of a cell picture according to some embodiments;

FIG. 5 is a schematic diagram of size detection on a cell according to some embodiments;

FIG. 6 is a flowchart of performing appearance detection based on a detection object to obtain detection result information, according to some embodiments;

FIG. 7 is a flowchart of performing appearance detection based on a detection object to obtain detection result information, according to some other embodiments;

DETAILED DESCRIPTION OF EMBODIMENTS

Figure 4:
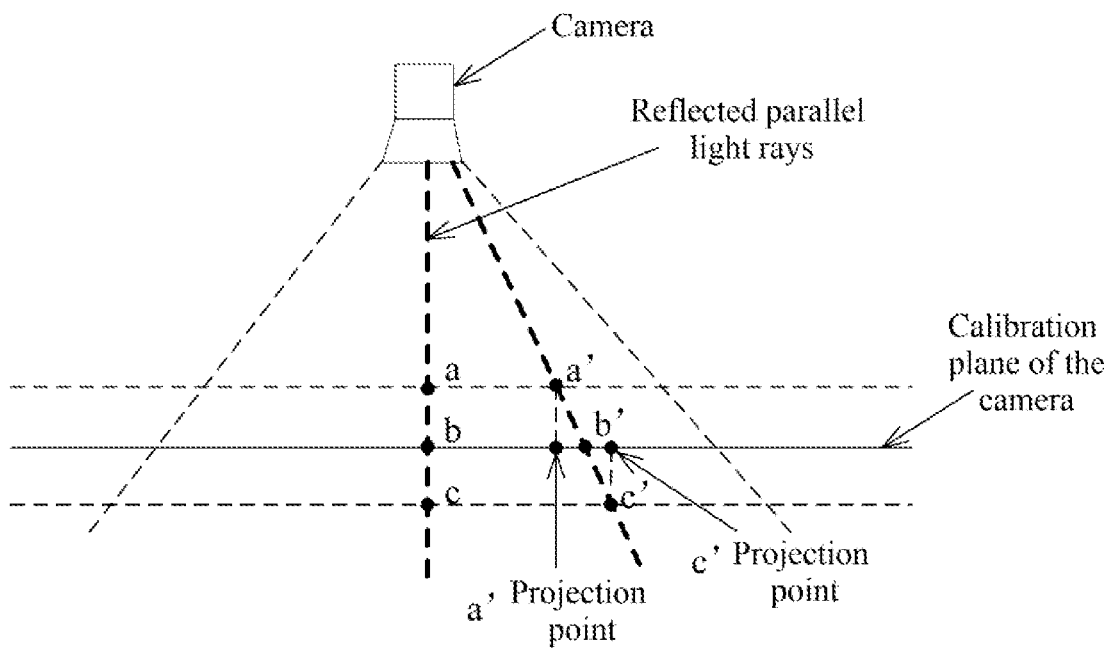
FIG. 4 is a schematic diagram of tab misalignment detection errors according to some embodiments.

In order to make the objective, technical solutions, and advantages of the present application clearer, the present application is further described in detail below with reference to the accompanying drawings and the embodiments. It should be understood that the specific embodiments described herein are merely used to explain the present application and are not intended to limit the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the indicated technical features. In the description of the embodiments of the present application, the phrase "a plurality of" means two or more, unless otherwise explicitly and specifically defined.

The phrase "embodiment" mentioned herein means that the specific features, structures and characteristics described in conjunction with the embodiment may be included in at least some embodiments of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: only A exists, both A and B exist, and only B exists. In addition, the character "/" herein generally indicates an "or" relationship between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on the orientation or position relationship shown in the accompanying drawings and are merely intended to facilitate and simplify the description of the embodiments of the present application, rather than indicating or implying that the apparatus or element considered must have a particular orientation or be constructed and operated in a particular orientation, and therefore not to be construed as limiting the embodiments of the present application.

In the description of the embodiments of the present application, unless otherwise explicitly specified and defined, the technical terms such as "install", "couple", "connect", and "fix" should be understood in a broad sense, for example, they may be a fixed connection, a detachable connection, or an integrated connection; may be a mechanical connection or an electric connection; and may be a direct connection or an indirect connection by means of an intermediate medium, or may be communication between interiors of two elements or interaction between the two elements. For those of ordinary skill in the art, the specific meanings of the above terms in the embodiments of the present application can be understood according to specific situations.

With the development of science and technology and the continuous progress of society, the application fields of power batteries continue to expand. They are not only used in electric bicycles, electric motorcycles, electric vehicles, and other electric transportation vehicles, but also used in the fields of military equipment, aerospace, etc. Power batteries are power supplies that supply power to tools, mostly are valve-regulated sealed lead-acid batteries, open tubular lead-acid batteries, and lithium iron phosphate batteries, and have characteristics such as high energy, high power, and high energy density. Appearance detection of bare cells is an extremely important process in the production process of cells of batteries. It plays the role of detecting whether a bare cell meets specifications of non-defective products, and can screen out unqualified products, so as to reduce adverse effects caused by unqualified products being transferred to a bare cell pairing process. In view of this, the present application provides an appearance detection method for a bare cell. In the method, a cell picture is obtained by shooting in alignment with positions of tabs on an edge of a bare cell, a detection object in the cell picture is determined, and appearance detection is performed based on the detection object to obtain detection result information. The cell picture is obtained by shooting in alignment with the positions of the tabs on the edge of the bare cell, such that imaging of cell edges is parallel light reflection imaging, which reduces an impact of a thickness of the cell on the edge authenticity of the tabs of the cell during imaging, and ensures the accuracy of image acquisition.

The appearance detection method for a bare cell according to an embodiment of the present application may be applied to an application environment shown in FIG. 1. After a bare cell 1 is transported by a transport line to an appearance detection station under the control of a control device (not shown in this figure), a cell picture is shot by using cameras 2 at the appearance detection station that are respectively in alignment with positions of tabs on an edge of the bare cell 1, the cell picture is uploaded to the control device, and the control device determines a detection object in the cell picture, and performs appearance detection based on the detection object to obtain detection result information. The bare cell 1 (or at least the positions of the tabs on the edge of the bare cell 1) is within a camera shooting range of the cameras 2, for example, the cameras 2 are located above the bare cell 1, such that the cameras 2 can be respectively in alignment with the positions of the tabs on the edge of the bare cell 1, so as to shoot the cell picture. There are two cameras 2, that is, the two cameras are used for image acquisition, so that full field-of-view coverage of the bare cell can be implemented. The cameras 2 may be specifically charge coupled device (CCD) cameras or other cameras. Specifically, the control device may include a control module and a host computer. The control module controls the transport line to transport the bare cell 1, the host computer controls the cameras 2 to shoot the cell picture of the bare cell 1, and then the host computer performs image analysis on the cell picture to obtain the detection result information. The control module may be a programmable logic controller (PLC), a microcontroller unit (MCU), or the like, and the host computer may be a notebook computer, a desktop computer, a logic controller, or the like.

Further, light sources 3 are provided at the appearance detection station, where the bare cell 1 is within a range of light emitted by the light sources 3, for example, the light sources 3 may be located above the bare cell 1, so as to facilitate image acquisition by the cameras 2. To help the cameras 2 to acquire a clearer cell picture, the light sources 3 may specifically include two pairs of light sources, where one pair of light sources is located above the two long sides of the bare cell 1, and the other pair of light sources is located above the two short sides of the bare cell 1. In addition, after the appearance detection of the bare cell is completed, the host computer further outputs an instruction to the control module, and the control module controls the transport line to transport the bare cell 1 to a next station, for example, transport it to a sorting station, the bare cell 1 is sorted based on the detection result information, and so on. For ease of understanding, the following explanation and description are given using an example in which the control module is a PLC and the host computer is a logic controller.

In some embodiments, as shown in FIG. 2, an appearance detection method for a bare cell is provided, where the method is applied to a control device, the control device may be specifically implemented by a logic controller, and the method includes the following steps.

In step S110, a cell picture of the bare cell is obtained by shooting.

The cell picture is obtained by shooting in alignment with positions of tabs on an edge of the bare cell. Specifically, after it is detected, by a sensor, that the bare cell is transported to a detection station, a PLC triggers cameras to shoot pictures, after determining that the cameras are ready, the PLC sends a signal to a logic controller, and after receiving the signal, the logic controller controls the two cameras arranged above the tabs on the edge of the bare cell to shoot the cell picture. As shown in FIG. 3, the cell picture contains a cell separator 11, tabs 12, and an identification layer 13, electrode plates of the cell are wrapped within the cell separator 11, and the identification layer 13 is used for setting identification information (such as a two-dimensional code) of the bare cell. The identification layer 13 may be specifically a blue adhesive, the two-dimensional code of the bare cell is set at the center of the blue adhesive, and there is a need to ensure a position of the blue adhesive in appearance detection, so as to avoid the following case: a barcode scanner at a next station in the production line fails to scan and read the code, causing a device breakdown. Further, the logic controller may control the cameras to shoot pictures twice to obtain a higher-exposure picture and a lower-exposure picture, each of which is used for related appearance detection of the bare cell. In addition, after the cameras complete shooting, the logic controller performs image detection while replying to the PLC with a signal indicating that the shooting is completed. Therefore, shooting and detection and calculation are performed simultaneously, thereby reducing a total detection duration and improving the detection efficiency. After receiving the signal indicating that the shooting is completed, the PLC controls the transport line to transport the bare cell to a sorting station.

In step S120, a detection object in the cell picture is determined.

The detection object refers to a feature related to appearance detection in the cell picture, and it can be understood that, cell pictures used for detection and detection objects in the cell pictures may vary depending on detection content of the bare cell. For example, the appearance detection of the bare cell may include tab folding detection, tab misalignment detection, poor pin pulling detection, electrode plate exposing detection, tab reverse detection, surface stain detection, bare cell size detection, and large surface indentation detection, etc. The higher-exposure picture of the shot cell pictures of the bare cell is used for size detection and pin pulling detection, so as to increase an edge contrast color difference of the cell, thereby facilitating edge finding of the cell, and improving the edge finding stability. The lower-exposure picture is used for product appearance detection (such as product surface stain detection, large surface indentation detection, and electrode plate exposing detection), and because the lower-exposure picture needs to be used to obtain surface feature information, the surface of the cell may not be overexposed during image acquisition, thereby preventing appearance defects on the surface of the product from being undetected due to overexposure. When performing appearance detection on the bare cell, the logic controller extracts a related feature from a corresponding cell picture and uses the feature as the detection object. For example, when size detection is performed on the bare cell, edges of the cell separator are found from the higher-exposure picture and used as the detection object for size detection.

In step S130, appearance detection is performed based on the detection object to obtain detection result information.

After determining the detection object in the cell picture, the logic controller may determine a related detection region based on the detection object, and perform corresponding appearance detection on the detection region to obtain the detection result information. With continued reference to FIG. 3, for different detection content, the cell picture may include separator detection regions 21, tab folding detection regions 22, pin pulling detection regions 23, an identification layer detection region 24, and a tab reverse detection region 25, and related content detection may be performed on the different detection regions based on image data in the detection regions.

As shown in FIG. 4, when the cell picture is shot by using the cameras, because a calibration plane of the cameras is placed in a measurement plane and the calibration plane of the camera is used as a reference coordinate system, the calibration plane of the camera is a reference projection plane for camera measurement, and data measured in this projection plane is the most accurate. It can be seen from FIG. 4 that, because projection points, obtained by reflection of parallel light rays, of measured objects a, b, and c are the same, measurement values of a and c are the same as that of b. Projection points of a' and c' are respectively located on both sides of a reference point b', and because positions of outermost measurement edges of the tabs in a stacking region of the tabs are not fixed, and a fixed compensation value cannot be added, an error may occur in a tab misalignment detection result or a pin pulling detection result obtained by measurement. During the appearance detection of the bare cell, because the positions of the outermost measurement edges of the tabs in the stacking region of the tabs are not fixed, and a fixed compensation value cannot be added, a detection error may occur, and the larger a tab folding region, the greater the error. In the present application, because the edges of the tabs are not in the same plane as the surface of the cell, when shooting is performed by using the two cameras, the cameras are arranged such that the central fields of view of the cameras are respectively in alignment with the positions of the tabs on the edge of the cell, to ensure that imaging of cell edges is parallel light being reflected onto the camera for imaging, and reduce the error caused due to that the positions of the outermost measurement edges of the tabs in the stacking region of the tabs are not fixed and a fixed compensation value cannot be added, thereby reducing an impact of a thickness of the cell on the edge authenticity of the tabs of the cell during imaging.

According to the above appearance detection method for a bare cell, the cell picture is obtained by shooting in alignment with the positions of the tabs on the edge of the bare cell, such that imaging of cell edges is parallel light reflection imaging, which reduces an impact of a thickness of the cell on the edge authenticity of the tabs of the cell during imaging, and ensures the accuracy of image acquisition, thereby improving the accuracy of appearance detection of the bare cell.

In some embodiments, the cell picture includes a first cell picture, an exposure of the first cell picture is higher than a preset exposure threshold, and the detection object includes an edge of the cell separator; and step S120 includes: determining a reference position in the first cell picture based on a preset cell model, and finding the edge of the cell separator based on the reference position.

The reference position is used as a reference starting point for edge finding, a specific setting method of the reference position is not unique, and the center position or another position of the cell separator may be selected as the reference position. As shown in FIG. 5, assuming that the center position of the cell separator is used as the reference position, the logic controller establishes a coordinate system based on the center position of the cell separator, finds edge points on the edges a, b, c, and d of the cell separator based on the coordinate system and set edge finding regions, and determines the edges of the cell separator by fitting based on the found edge points. For the edge c where the tabs 12 are arranged, to skip over tab regions, a plurality of different edge finding regions may be set for edge finding, and the edge c is obtained by fitting based on all points found in real time on each of three segments, thereby preventing the tab regions from affecting positions where real-time finding is to be performed.

Specifically, a cell model may be established by using the CogPMAligTool tool, and the cell model is matched from the higher-exposure picture, to obtain center position coordinates (X, Y, R) of the cell separator. A spatial coordinate system is established based on the coordinates by using the CogFixtureTool tool, CCD vision is established, and edge finding regions free from interference of the tab regions are set by using the edge finding tool CogFindLineTool in a space following mode, so that corresponding edges may be obtained; and corresponding attributes of the edge finding tool may be set (for example, a polarity is set to Dark to Light/Light to Dark, and a priority of an edge calculation method is set to region center, search direction, or the like), so that corresponding edge positions are obtained.

In this embodiment, the higher-exposure picture of the bare cell is obtained by shooting at a higher exposure, which increases an edge contrast color difference of the bare cell, and facilitates edge finding of the cell, and the reference position in the higher-exposure picture is determined based on the preset cell model, so as to accurately and quickly obtain the edge of the cell separator.

Correspondingly, in some embodiments, the detection result information includes size data. As shown in FIG. 6, step S130 includes steps S132 and S134.

In step S132, distances between all points on an edge of the cell separator and an opposite edge are calculated to obtain a plurality of pieces of edge distance data. The edge distance data includes length data and width data.

As shown in FIG. 5, length data can be obtained by calculating distances between the edge a and the edge b, and width data can be obtained by calculating distances between the edge c and the edge d. For example, to calculate length data, the length data can be obtained by calculating distances between all points on the edge a and the edge b; can be obtained based on a plurality of edge distance values, the plurality of edge distance values being obtained by calculating distances between all points on the edge b and the edge a; or can be obtained based on a plurality of edge distance values, the plurality of edge distance values being obtained by calculating distances between all points on the edge a and the edge b and also calculating distances between all points on the edge b and the edge a.

In step S134, the size data is obtained based on the plurality of pieces of edge distance data.

After the plurality of pieces of edge distance data are obtained by calculation, averaging may be performed on a plurality of pieces of length data to obtain an average length value, and may be performed on a plurality of pieces of width data to obtain an average width value, and the average length value and the average width value are used as length and width size data of the bare cell. In some other embodiments, alternatively, after the average length value and the average width value are calculated, each piece of length data is compared with the average length value to remove length data whose difference with the average length value meets a preset difference threshold, so as to obtain target length data; each piece of width data is compared with the average width value to remove width data whose difference with the average width value meets a preset difference threshold, so as to obtain target width data; and an average value of the target length data is used as a final length and an average value of the target width data is used as a final width, so as to obtain the size data of the bare cell. In other embodiments, alternatively, weighted averaging may be performed on the length data to obtain an average length value, and may be performed on the width data to obtain an average width value, and the average length value and the average width value are used as length and width size data of the bare cell.

Specifically, based on the four edges a, b, c, and d that are found in real time, distances between all points in the line a and the line b are calculated to obtain a plurality of pieces of length data, an average value of the plurality of pieces of length data is calculated, distances between all points in the line c and the line d are calculated to obtain a plurality of pieces of width data, and an average value of the plurality of pieces of width data is calculated, so as to obtain a length and a width. For example, the edge b is found in real time by using CogFindLineTool1, the edge b found in real time by CogFindLineTool1.Results.GetLine( ) is obtained, and the edge a is found in real time by using CogFindLineTool2. After the edge a and the edge b are determined, the number Count of point positions found in real time is obtained by CogFindLineTool2.Results.Count, a loop is performed with a loop statement For(int i=0;i<Count−1,i++) to obtain all points on a corresponding edge, and the CogDistancePiont-LineTool operator tool is used. In the operator tool, the edge b is assigned a value:

CogDistancePiontLineTool.Line CogFindLineTool2.Results[i].X/CogFindLineTool2.Results [i].Y.

The value assigning CogDistancePiontLineTool.X/ CogDistancePiontLineTool.Y operator runs to obtain distances between all points on the edge a and the edge b, so as to obtain an average distance. After a corresponding edge is found, coordinates of each point on the edge can be directly obtained by the operator, that is, all the points on the edge are known, all the points on the edge can be called repeatedly, and an average distance can be calculated based on the coordinates of the points on the edge.

In this embodiment, the distances between all points on an edge of the cell separator and an opposite edge are calculated, and averaging is performed on the obtained edge distance data to determine the size data of the bare cell, which ensures the accuracy of size detection.

In some embodiments, the detection result information includes a pin pulling detection result. As shown in FIG. 7, step S130 includes steps S136 and S138.

In step S136, a pin pulling detection region is determined based on the edge of the cell separator.

Figure 8:
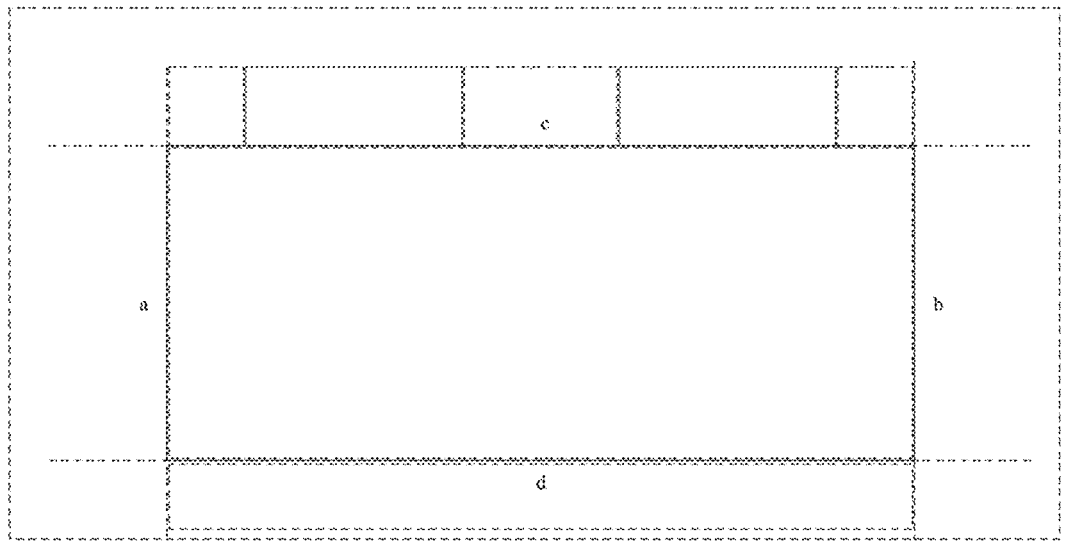
FIG. 8 is a schematic diagram of pin pulling detection on a cell according to some embodiments.

After the edge of the cell separator is determined, the corresponding pin pulling detection region is set based on the edge of the cell separator, so that pin pulling detection can be performed by positioning based on different pin pulling detection regions. Different positioning spaces are established based on different regions, so as to ensure the stability of the pin pulling detection regions. As shown in FIG. 8, a spatial coordinate system is re-established by using an intersection point of the edge a and the edge c (or the edge b and the edge c) as an origin of the coordinate system for search box space following of upward pin pulling detection. Similarly, a spatial coordinate system is re-established by using an intersection point of the edge a and the edge d as an origin of the coordinate system for search box space following of downward pin pulling detection.

In step S138, detection is performed on the pin pulling detection region to obtain the pin pulling detection result.

Specifically, pin pulling detection may be performed by obtaining information within the pin pulling detection region by using the Blob operator tool, so as to determine whether there is poor pin pulling. Poor pin pulling may be understood as the occurrence of protrusions in some regions along the edge. A spot with a contrast difference (information such as a length and width/an area of the spot) in a Blob region may be obtained by using a visual Blob spot tool, the Blob region is set at a region along the edge of the cell, the Blob region is shifted to a fixed position based on pin pulling detection specifications (for example, if the pin pulling specification is 0.1 millimeter (mm), the Blob region is set at a position outside and 0.1 mm away from the edge of the cell separator), and when a spot with a contrast difference is detected by using the Blob operator tool, it indicates over-limit pin pulling. In this embodiment, the pin pulling detection region is determined based on the edge of the cell separator, and pin pulling detection may be quickly and conveniently performed on the pin pulling detection region.

In some embodiments, step S138 includes: looking for and obtaining spot information within the pin pulling detection region, and obtaining the pin pulling detection result by analysis based on the spot information. The spot information is looked for and obtained within the pin pulling detection region, and pin pulling detection on the bare cell is implemented based on the obtained spot information. A specific type of the spot information is not unique, and in some embodiments, the spot information includes at least one of an area of a single spot, a size of a spot, and a sum of spot areas. It may be set, according to actual situations, that pin pulling detection is performed on the bare cell based on one or more of an area of a single spot, a size of a spot, and a sum of spot areas, so as to improve the detection convenience.

For example, edge finding is performed on the pin pulling detection region in real time by using the CogBlobTool1 operator, and space following used for the pin pulling detection region is the corresponding spatial coordinate system established in step S136, which ensures the stability of the detection region. The number of spots found in real time is obtained by CogBlobTool1.Results. GetBlobs( ).count, and a loop is performed with a loop statement For(int i=0;i<Count−1,i++) to obtain all spots (a height/width/area) in the corresponding region.

By means of CogBlobTool1.Results.GetBlobs( )[i].Get-Measure(CogBlobMeasureConstants.BoundingBoxEx-tremaAngleHeiht)

/CogBlobTool1.Results.GetBlobs(      )[i].GetMeasure (CogBlobMeasureConstants.BoundingBoxExtremaAn-gleWidth)

/CogBlobTool1.Results.GetBlobs(   )[i].Area, obtained height and width data are respectively stored into an array (height) and another array (width), whether the data in the arrays meet specifications is determined, spot areas are summed to obtain a sum of spot areas, and whether the sum of spot areas meets specifications is determined. Specifi-cally, when the data in the height and width arrays do not meet the specifications, it is directly determined that a detection result is unqualified. When the data in the height and width arrays meet the specifications, and if the sum of spot areas meets the specifications, it is determined that the detection result is qualified. Otherwise, it is determined that the detection result is unqualified.

In some other embodiments, step S138 includes: obtain-ing distance values between edge points of the cell separator in the pin pulling detection region and the corresponding edge, and obtaining the pin pulling detection result by analysis based on the plurality of distance values.

Specifically, the plurality of distance values may be sorted to obtain the sorted distance values, a maximum value of the sorted distance values is selected, and whether there is a problem of poor pin pulling is detected based on the maxi-mum value. The edge a is used as an example. A maximum value of distances between points at the edge a and the edge a is obtained, the maximum value may be understood as the largest protruding point on the edge a, and whether there is poor pin pulling is detected based on the maximum distance, which facilitates finding of protrusions of the entire edge caused during pin pulling. For example, an edge is found in real time by using CogFindLineTool3, the number Count of point positions found in real time is obtained by CogFindLineTool3.Results.Count, a loop is performed with a loop statement For(int i=0;i<Count−1,i++) to obtain all point positions on the corresponding edge, a distance between each point and the edge is obtained by using the CogFindLineTool3.Results[i].DistanceToLine( ) algorithm, a result is stored in an array, data in the array are sorted by value size to obtain a maximum value, and finally whether the value is within a detection specification range is determined. It can be understood that, in other embodiments, pin pulling detection may alternatively be performed by using another method, for example, calculating an average value of the distance values, and determining whether the average value is within a preset detection specification range, so as to detect whether there is poor pin pulling.

In this embodiment, pin pulling detection is performed by analysis on distance values between edge points of the cell separator in the pin pulling detection region and the corresponding edge, which facilitates finding of protrusions of the entire edge caused during pin pulling.

Figure 9:
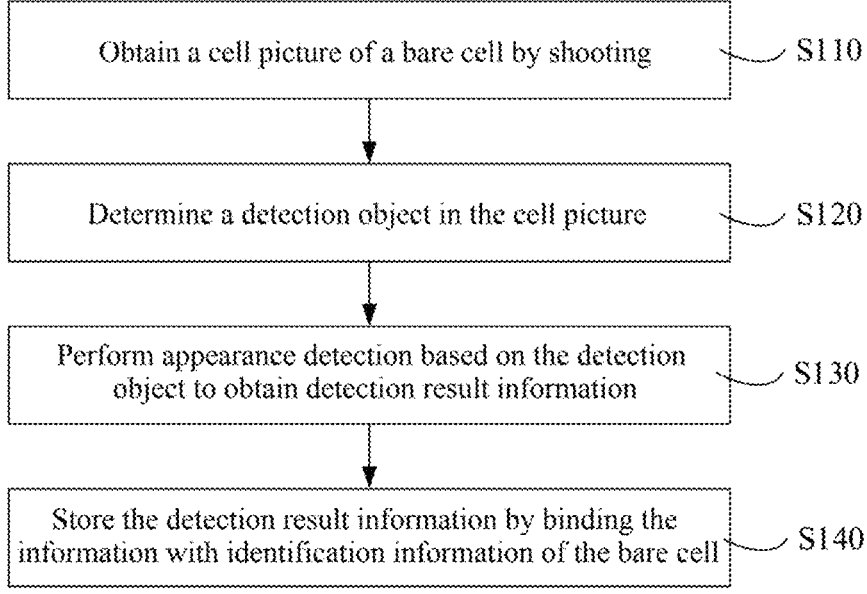
FIG. 9 is a schematic flowchart of an appearance detection method for a bare cell according to some other embodiments.

In addition, in some embodiments, as shown in FIG. 9, after step S130, the method may further include step S140: storing, by a logic controller, the detection result information by binding the information with identification information of the bare cell. Assuming that the identification information is a two-dimensional code, the logic controller may further obtain the two-dimensional code on the identification layer by performing image recognition on the higher-exposure picture. After obtaining the detection result information, the logic controller stores the detection result information in a database by binding the information with the identification information of the bare cell. The logic controller may upload the detection result information to a manufacturing execution system (MES) at the same time. After the bare cell is transported to the sorting station, the PLC triggers a barcode scanner to scan the two-dimensional code on the bare cell to identify the detection result information in the database that corresponds to the bare cell, the detection result information may indicate whether the bare bell is a non-defective product or a defective product, and it is further determined, based on the identified detection result information, whether the bare cell is a non-defective product; and if the cell is a non-defective product, the PLC controls a material handling manipulator to move the cell to a non-defective product storage region; or if the cell is a defective product, the PLC controls the material handling manipulator to move the cell to a defective product storage region.

In this embodiment, the detection result information is stored by binding it with the identification information of the bare cell, which facilitates sorting of the bare cell at a next station based on the detection result information.

It should be understood that although each step in the flowchart of each embodiment described above is displayed in succession as indicated by an arrow, these steps are not necessarily executed in succession in the order indicated by the arrows. Unless explicitly described herein, the execution of these steps is not limited to a strict order, instead, the steps may be executed in another order. In addition, at least some steps in the flowcharts of the embodiments as described above may include multiple steps or multiple stages. These steps or stages are not necessarily executed or completed at the same moment, but can be executed at different moments. These steps or stages are also not necessarily executed in succession, but can be executed in turn or alternately with at least some other steps or steps or stages of other steps.

Based on the same inventive concept, an embodiment of the present application further provides an appearance detection apparatus for a bare cell configured to implement the above appearance detection method for a bare cell. An implementation solution for solving the problems that is provided by the apparatus is similar to the implementation solution of the above method. Therefore, for specific definitions of one or more embodiments of the appearance detection apparatus for a bare cell provided below, reference may be made to the definitions of the above appearance detection method for a bare cell, and details are not described herein again.

Figure 10:
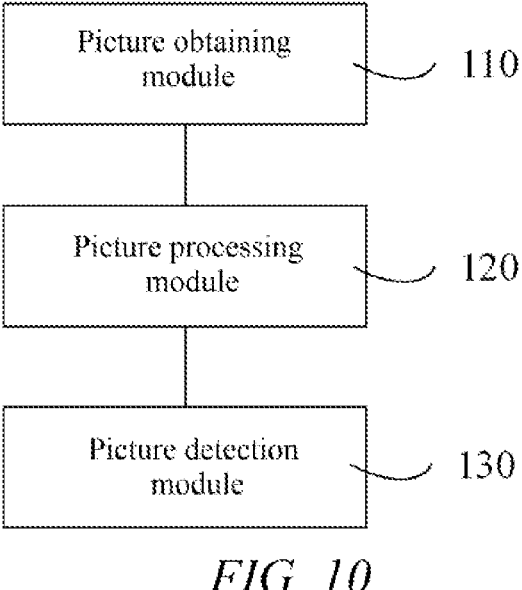
FIG. 10 is a block diagram of a structure of an appearance detection apparatus for a bare cell according to some embodiments.

In some embodiments, as shown in FIG. 10, an appearance detection apparatus for a bare cell is provided, including: a picture obtaining module 110, a picture processing module 120, and a picture detection module 130.

The picture obtaining module 110 is configured to obtain a cell picture of the bare cell by shooting, the cell picture being obtained by shooting in alignment with positions of tabs on an edge of the bare cell.

The picture processing module 120 is configured to determine a detection object in the cell picture.

The picture detection module 130 is configured to perform appearance detection based on the detection object to obtain detection result information.

In some embodiments, the cell picture includes a first cell picture, an exposure of the first cell picture is higher than a preset exposure threshold, and the detection object includes an edge of the cell separator. The picture processing module 120 determines a reference position in the first cell picture based on a preset cell model, and finds the edge of the cell separator based on the reference position.

In some embodiments, the detection result information includes size data. The picture detection module 130 calculates distances between all points on an edge of the cell separator and an opposite edge to obtain edge distance data; and obtains the size data by performing averaging on the edge distance data.

In some embodiments, the detection result information includes a pin pulling detection result. The picture detection module 130 determines a pin pulling detection region based on the edge of the cell separator; and performs detection on the pin pulling detection region to obtain the pin pulling detection result.

In some embodiments, the picture detection module 130 looks for and obtains spot information within the pin pulling detection region, and obtains the pin pulling detection result by analysis based on the spot information.

In some embodiments, the picture detection module 130 obtains distance values between edge points of the cell separator in the pin pulling detection region and the corresponding edge, and obtains the pin pulling detection result by analysis based on a maximum value of the distance values.

In some embodiments, the picture detection module 130 stores the detection result information by binding the information with identification information of the bare cell.

All or some of the various modules in the above appearance detection apparatus for a bare cell may be implemented by software, hardware, and a combination thereof. The modules above may be embedded in or independent of a processor in a computer device in the form of hardware, and may also be stored in a memory of the computer device in the form of software, so that the processor invokes the corresponding operations executing the modules above.

In some embodiments, a computer device is provided. The computer device may be a server or a terminal. Assuming that the computer device is a server, a diagram of an internal structure thereof may be shown in FIG. 11. The computer device includes a processor, a memory, and a network interface that are connected through a system bus. The processor of the computer device is configured to provide computing and control capabilities. The memory of the computer device includes a non-volatile storage medium and an internal memory. The non-volatile storage medium stores an operating system, a computer program, and a database. The internal memory provides an environment for operation of the operating system and the computer program in the non-volatile storage medium. The database of the computer device is used to store data. The network interface of the computer device is for communicating with an external terminal through a network connection. When the computer program is executed by the processor, an appearance detection method for a bare cell is implemented.

Figure 11:
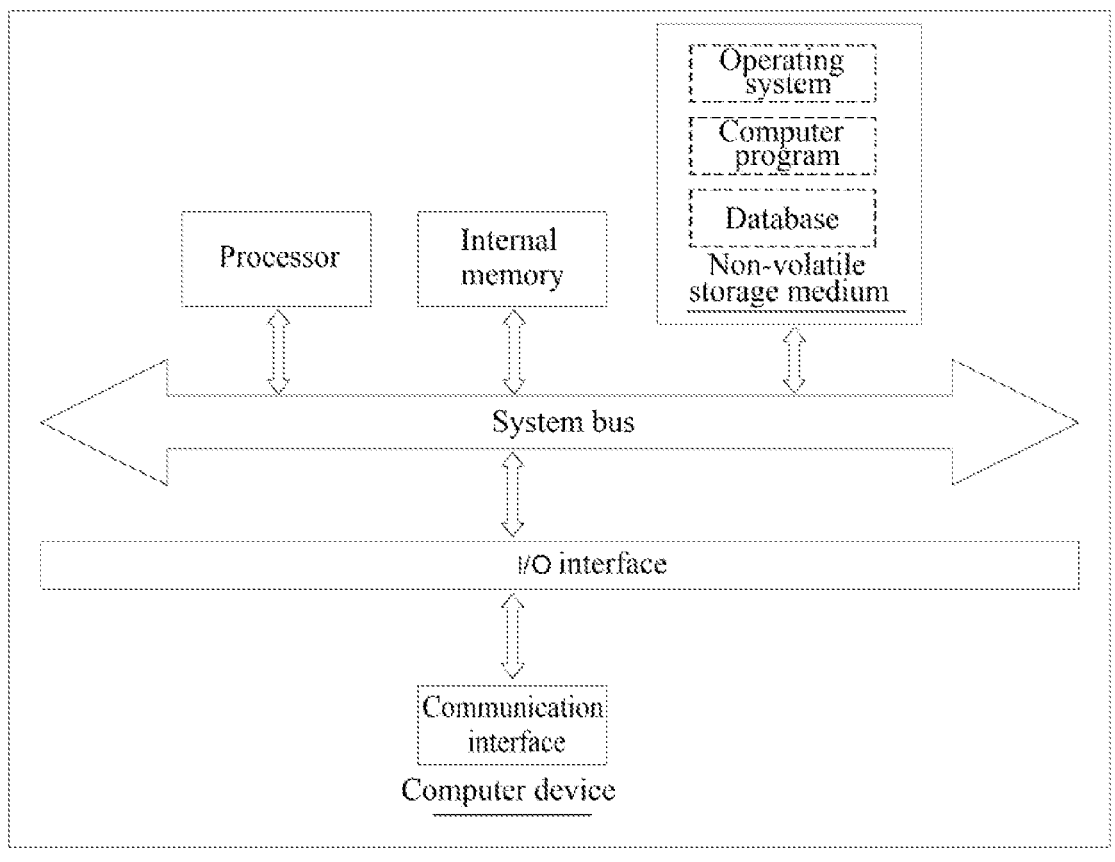
FIG. 11 is a diagram of an internal structure of a computer device according to some embodiments.

Those skilled in the art can understand that a structure shown in FIG. 11 is merely a block diagram of a part of the structure related to the solutions of the present application, and does not constitute a limitation on the computer device to which the solutions of the present application is applied. Specifically, the computer device may include more or fewer components than those shown in the drawings, or integrate some components, or have different component arrangements.

In some embodiments, a computer device is provided, including: a memory and one or more processors, where the memory stores computer-readable instructions that, when executed by the one or more processors, cause the one or more processors to perform the steps of the above method embodiments.

In some embodiments, one or more computer storage media are provided, where the computer storage media store computer readable instructions that, when executed by one or more processors, cause the one or more processors to perform the steps of the above method embodiments.

In some embodiments, a computer program product is provided, where the computer program, when executed by one or more processors, causes the one or more processors to perform the steps of the above method embodiments.

In some embodiments, an appearance detection system for a bare cell is further provided, including: an image obtaining apparatus and a host computer. The image obtaining apparatus is configured to obtain a cell picture by shooting in alignment with positions of tabs on an edge of the bare cell, and send the cell picture to the host computer. The host computer is configured to perform appearance detection on the bare cell by using the above appearance detection method for a bare cell.

The image obtaining apparatus uses two cameras, specifically two CCD cameras. To help the two cameras to better acquire pictures of the bare cell and ensure the accuracy of a detection result, the two cameras may be located above the bare cell, and a distance between the two cameras and the bare cell may be set to 423 mm±25 mm based on models of the cameras. The host computer may be a notebook computer, a desktop computer, a logic controller, or the like. Specifically, to improve a detection effect and reduce probabilities of false detection and missed detection, the two cameras may be 12 MP color area-array cameras, fields of view of the cameras in an X direction may be 260 mm, and pixel precision may be 0.06 mm/pixel, so that the two cameras may implement full field-of-view coverage of the cell. The cameras shoot pictures twice to obtain a higher-exposure picture used for size detection of the bare cell and a lower-exposure picture used for defect detection of the bare cell. In addition, the appearance detection system for a bare cell further includes light sources. Similarly, to enable the cameras to shoot a clearer cell picture, a distance between the light sources and the bare cell may be set to 100 mm±20 mm. Specifically, the light sources may include a pair of light sources arranged above the two long sides of the bare cell, and a distance between the two light sources may be 370 mm±30 mm. The light sources may further include a pair of light sources arranged above the two short sides of the bare cell, and a distance between the two light sources may be 370 mm±30 mm. As the bare cell is transported to a detection station, under the condition of ensuring precision, pictures of corresponding regions of the bare cell are respectively shot by using the two cameras, a variety of products may be applicable, and a camera field of view ranges from a minimum of 120° to a maximum of 305°. In the detection process, the distance between the two cameras may be adjusted depending on a model of the bare cell, the distance between the light sources and the bare cell is designed to be 100 mm±20 mm, an angle may be adjusted within a range of 0° to 90°, and the distance between the light sources is designed to be 370 mm±30 mm, which applies to bare cells of a maximum size and a minimum size.

Those of ordinary skill in the art can understand that all or some of the procedures in the methods of the above embodiments can be implemented by a computer program to instruct related hardware. The computer program can be stored in a computer-readable storage medium. The program, when executed, may include the procedures in the above method embodiments. The storage medium may be a non-volatile storage medium such as a magnetic disk, an optical disc, or a read-only memory (ROM), a random access memory (RAM), or the like.

The various technical features of the above embodiments can be combined in any manner, and in order to simplify the description, not all possible combinations of the various technical features of the above embodiments are described. However, as long as there is no conflict between the combinations of these technical features, they should be considered to be within the scope of the description in this application.

The above embodiments merely represent several implementations of the present application, giving specifics and details thereof, but should not be understood as limiting the scope of the present patent of invention thereby. It should be pointed out that those of ordinary skill in the art may also make several variations and improvements without departing from the concept of the present application. All these variations and improvements fall within the scope of protection of the present application. Therefore, the scope of protection of the present application shall be subject to the appended claims.

The invention claimed is:

1. An appearance detection method for a bare cell, comprising:

obtaining a cell picture of the bare cell by shooting, the cell picture being obtained by shooting in alignment with positions of tabs on an edge of the bare cell, so that a tab region and an edge of a cell separator adjacent to the tab region are included in the cell picture, wherein the cell picture comprises a first cell picture, an exposure of the first cell picture is higher than a preset exposure threshold;

determining a detection object in the cell picture, the detection object comprising an edge of a cell separator, wherein determining the detection object in the cell picture further comprises:

determining a reference position in the first cell picture based on a preset cell model, wherein determining the reference position comprises matching the preset cell model from the first cell picture to obtain center position coordinates of the cell separator and establishing a spatial coordinate system based on the center position coordinates, setting edge finding regions free from interference of tab regions in a space following mode, wherein for an edge where the tabs are arranged, a plurality of different edge finding regions are set to skip over tab regions, and the edge of the cell separator is obtained by fitting based on points found in real time in the plurality of different edge finding regions, and finding the edge of the cell separator based on the reference position; and performing appearance detection based on the detection object to obtain detection result information, the detection result information comprising pin pulling detection result, wherein the performing appearance detection further comprises:

re-establishing a spatial coordinate system by using an intersection point of edges of the cell separator as an origin of the coordinate system, determining a pin pulling detection region based on the edge of the cell separator and positions of the tabs; and performing detection on the pin pulling detection region to obtain the pin pulling detection result, wherein the performing detection on the pin pulling detection region further comprises:

obtaining distance values between edge points of the cell separator in the pin pulling detection region and a corresponding edge of the cell separator to obtain a plurality of distance values; and obtaining the pin pulling detection result by analysis based on the plurality of distance values.

2. The method according to claim 1, wherein the detection result information comprises size data; and the performing appearance detection based on the detection object to obtain detection result information comprises:

calculating distances between all points on an edge of the cell separator and an opposite edge to obtain a plurality of pieces of edge distance data; and obtaining the size data based on the plurality of pieces of edge distance data.

3. The method according to claim 2, wherein the edge distance data comprises length data and width data; and the obtaining the size data based on the plurality of pieces of edge distance data comprises:

performing averaging on a plurality of pieces of length data to obtain an average length value;

performing averaging on a plurality of pieces of width data to obtain an average width value; and obtaining the size data based on the average length value and the average width value.

4. The method according to claim 1, wherein the performing detection on the pin pulling detection region to obtain the pin pulling detection result comprises:

looking for and obtaining spot information within the pin pulling detection region, and obtaining the pin pulling detection result by analysis based on the spot information.

5. The method according to claim 4, wherein the spot information comprises at least one of an area of a single spot, a size of a spot, and a sum of spot areas.

6. The method according to claim 1, wherein the obtaining the pin pulling detection result by analysis based on the plurality of distance values comprises:

sorting the plurality of distance values to obtain sorted distance values;

selecting a maximum value of the sorted distance values; and obtaining the pin pulling detection result by analysis based on the selected maximum value.

7. The method according to claim 1, wherein after the performing appearance detection based on the detection object to obtain detection result information, the method further comprises: storing the detection result information by binding the information with identification information of the bare cell.

8. The method according to claim 1, wherein the cell picture is shot by using two cameras respectively in alignment with the positions of the tabs on the edge of the bare cell.

9. An appearance detection system for a bare cell, the appearance detection system comprising: an image obtaining apparatus and a host computer, wherein the image obtaining apparatus is configured to obtain a cell picture by shooting in alignment with positions of tabs on an edge of the bare cell, and send the cell picture to the host computer; and the host computer is configured to perform appearance detection on the bare cell by using a method according to claim 1.

10. The system according to claim 9, wherein the image obtaining apparatus comprises two cameras.

11. An appearance detection apparatus for a bare cell, the appearance detection apparatus comprising:

a picture obtaining module configured to obtain a cell picture of the bare cell by shooting, the cell picture being obtained by shooting in alignment with positions of tabs on an edge of the bare cell, so that a tab region and an edge of a cell separator adjacent to the tab region are included in the cell picture, wherein the cell picture comprises a first cell picture, an exposure of the first cell picture is higher than a preset exposure threshold;

a picture processing module configured to determine a detection object in the cell picture, the detection object comprising an edge of a cell separator, wherein the picture processing module is further configured to:

determine a reference position in the first cell picture based on a preset cell model, wherein determining the reference position comprises matching the preset cell model from the first cell picture to obtain center position coordinates of the cell separator and establishing a spatial coordinate system based on the center position coordinates, setting edge finding regions free from interference of tab regions in a space following mode, wherein for an edge where the tabs are arranged, a plurality of different edge finding regions are set to skip over tab regions, and the edge of the cell separator is obtained by fitting based on points found in real time in the plurality of different edge finding regions, and find the edge of the cell separator based on the reference position; and a picture detection module configured to perform appearance detection based on the detection object to obtain detection result information, the detection result information comprising pin pulling detection result, wherein the picture detection module is further configured to:

re-establishing a spatial coordinate system by using an intersection point of edges of the cell separator as an origin of the coordinate system, determine a pin pulling detection region based on the edge of the cell separator and positions of the tabs; and perform detection on the pin pulling detection region to obtain the pin pulling detection result, wherein the picture detection module is further configured to:

obtain distance values between edge points of the cell separator in the pin pulling detection region and a corresponding edge of the cell separator to obtain a plurality of distance values; and obtain the pin pulling detection result by analysis based on the plurality of distance values.

12. The appearance detection apparatus according to claim 11, wherein the detection result information comprises size data; and the picture processing module is further configured to:

calculate distances between all points on an edge of the cell separator and an opposite edge to obtain a plurality of pieces of edge distance data; and obtain the size data based on the plurality of pieces of edge distance data.

13. The appearance detection apparatus according to claim 12, wherein the edge distance data comprises length data and width data; and the picture processing module is further configured to:

perform averaging on a plurality of pieces of length data to obtain an average length value;

perform averaging on a plurality of pieces of width data to obtain an average width value; and obtain the size data based on the average length value and the average width value.

14. The appearance detection apparatus according to claim 11, wherein the picture processing module is further configured to:

look for and obtaining spot information within the pin pulling detection region, and obtaining the pin pulling detection result by analysis based on the spot information.

15. The appearance detection apparatus according to claim 11, wherein the picture processing module is further configured to:

sort the plurality of distance values to obtain sorted distance values;

select a maximum value of the sorted distance values; and obtain the pin pulling detection result by analysis based on the selected maximum value.

16. A computer device, comprising:

a memory; and one or more processors, wherein the memory stores computer-readable instructions that, when executed by the one or more processors, cause the one or more processors to:

obtain a cell picture of a bare cell by shooting, the cell picture being obtained by shooting in alignment with positions of tabs on an edge of the bare cell, so that a tab region and an edge of a cell separator adjacent to the tab region are included in the cell picture, wherein the cell picture comprises a first cell picture, an exposure of the first cell picture is higher than a preset exposure threshold, determine a detection object in the cell picture, the detection object comprising an edge of a cell separator, determine a reference position in the first cell picture based on a preset cell model, match the preset cell model from the first cell picture to obtain center position coordinates of the cell separator and establish a spatial coordinate system based on the center position coordinates, set edge finding regions free from interference of tab regions in a space following mode, wherein for an edge where the tabs are arranged, a plurality of different edge finding regions are set to skip over tab regions, and the edge of the cell separator is obtained by fitting based on points found in real time in the plurality of different edge finding regions, find the edge of the cell separator based on the reference position, perform appearance detection based on the detection object to obtain detection result information, re-establish a spatial coordinate system by using an intersection point of edges of the cell separator as an origin of the coordinate system, determine a pin pulling detection region based on the edge of the cell separator, perform detection on the pin pulling detection region to obtain pin pulling detection result, wherein the pin pulling detection result is included in the detection result information, obtain distance values between edge points of the cell separator in the pin pulling detection region and a corresponding edge of the cell separator to obtain a plurality of distance values, and obtain the pin pulling detection result by analysis based on the plurality of distance values.

17. The computer device according to claim 16, wherein the computer-readable instructions when executed by the one or more processors further cause the one or more processors to:

calculate distances between all points on an edge of the cell separator and an opposite edge to obtain a plurality of pieces of edge distance data; and obtain size data based on the plurality of pieces of edge distance data, wherein the size data is included in the detection result information.

18. The computer device according to claim 17, wherein the computer-readable instructions when executed by the one or more processors further cause the one or more processors to:

perform averaging on a plurality of pieces of length data of the edge distance data to obtain an average length value;

perform averaging on a plurality of pieces of width data the edge distance data to obtain an average width value; and obtain the size data based on the average length value and the average width value.

19. The computer device according to claim 16, wherein the computer-readable instructions when executed by the one or more processors further cause the one or more processors to:

look for and obtaining spot information within the pin pulling detection region, and obtaining the pin pulling detection result by analysis based on the spot information.

20. The computer device according to claim 16, wherein the computer-readable instructions when executed by the one or more processors further cause the one or more processors to:

sort the plurality of distance values to obtain sorted distance values;

select a maximum value of the sorted distance values; and obtain the pin pulling detection result by analysis based on the selected maximum value.

* * * * *